United States Patent
Chen et al.

(10) Patent No.: US 11,907,658 B2
(45) Date of Patent: Feb. 20, 2024

(54) USER-AGENT ANOMALY DETECTION USING SENTENCE EMBEDDING

(71) Applicant: PayPal, Inc., San Jose, CA (US)

(72) Inventors: Zhe Chen, Singapore (SG); Hewen Wang, Singapore (SG); Yuzhen Zhuo, Singapore (SG); Solomon kok how Teo, Singapore (SG); Shanshan Peng, Singapore (SG); Quan Jin Ferdinand Tang, Singapore (SG); Serafin Trujillo, Singapore (SG); Kenneth Bradley Snyder, San Jose, CA (US); Mandar Ganaba Gaonkar, San Jose, CA (US); Omkumar Mahalingam, Santa Clara, CA (US)

(73) Assignee: PayPal, Inc., San Jose, CA (US)

( * ) Notice: Subject to any disclaimer, the term of this patent is extended or adjusted under 35 U.S.C. 154(b) by 275 days.

(21) Appl. No.: 17/308,931

(22) Filed: May 5, 2021

(65) Prior Publication Data
US 2022/0358289 A1  Nov. 10, 2022

(51) Int. Cl.
*G06F 40/279* (2020.01)
*G06F 21/55* (2013.01)
*G06F 21/56* (2013.01)
*G06F 40/284* (2020.01)
*G06F 40/30* (2020.01)
*G06F 18/2321* (2023.01)
*G06F 18/2415* (2023.01)

(52) U.S. Cl.
CPC ........ *G06F 40/284* (2020.01); *G06F 18/2321* (2023.01); *G06F 18/2415* (2023.01); *G06F 40/30* (2020.01)

(58) Field of Classification Search
CPC ........ G06F 21/30; G06F 21/55; G06F 40/279; G06F 40/284; G06F 21/56; G06F 21/564; G06F 21/566
USPC ......... 704/1, 9; 726/2, 4, 17, 27, 29, 22, 23; 706/12
See application file for complete search history.

(56) References Cited

U.S. PATENT DOCUMENTS

| | | | |
|---|---|---|---|
| 9,690,936 B1 * | 6/2017 | Malik | G06F 21/566 |
| 9,876,825 B2 * | 1/2018 | Amar | H04L 67/01 |
| 10,007,786 B1 * | 6/2018 | Bhatkar | G06F 21/561 |
| 10,958,779 B1 * | 3/2021 | Rule | G10L 15/22 |
| 11,003,773 B1 * | 5/2021 | Fang | H04L 63/0263 |
| 11,356,472 B1 * | 6/2022 | Maiorana | H04L 63/107 |
| 11,418,461 B1 * | 8/2022 | Elfardy | G06N 3/006 |
| 11,463,475 B1 * | 10/2022 | Colon | H04M 3/42195 |

(Continued)

FOREIGN PATENT DOCUMENTS

EP  3588352 A1 *  1/2020 ........... G06F 21/552

*Primary Examiner* — Martin Lerner
(74) *Attorney, Agent, or Firm* — Haynes and Boone, LLP

(57) ABSTRACT

Systems and methods for user-agent anomaly detection are disclosed. In one embodiment, a user-agent string may be embedded into a numerical data vector representation using a sentence embedding algorithm (e.g., FastText). A predictive score may be calculated based on the numerical data vector representation and using a probability distribution function model that models a likelihood of occurrence of the observed user-agent based on patterns learned from historic payload data (e.g., a Gaussian Mixture Model). The predictive score may be compared to a threshold and, based on the comparison, it may be determined whether the user-agent is fraudulent.

20 Claims, 6 Drawing Sheets

(56) References Cited

U.S. PATENT DOCUMENTS

| | | | |
|---|---|---|---|
| 2012/0174224 A1* | 7/2012 | Thomas | G06F 9/45533 |
| | | | 726/24 |
| 2016/0306935 A1* | 10/2016 | Rajan | G16H 50/20 |
| 2017/0140384 A1* | 5/2017 | Zoldi | G06Q 40/12 |
| 2017/0315984 A1* | 11/2017 | Goyal | G06F 40/30 |
| 2019/0007434 A1* | 1/2019 | McLane | G06N 3/084 |
| 2020/0226126 A1* | 7/2020 | Zou | G06F 40/289 |
| 2020/0226703 A1* | 7/2020 | Abad | G06F 40/20 |
| 2020/0364338 A1* | 11/2020 | Ducau | G06N 3/084 |
| 2021/0117552 A1* | 4/2021 | Vlissidis | G06F 40/284 |
| 2021/0256115 A1* | 8/2021 | Shashanka | G06F 40/30 |
| 2021/0281593 A1* | 9/2021 | Liu | G06N 5/04 |
| 2021/0312041 A1* | 10/2021 | Gururajan | G06N 20/00 |
| 2021/0328888 A1* | 10/2021 | Rath | H04L 41/5074 |
| 2021/0365772 A1* | 11/2021 | Zhang | G06N 3/04 |
| 2022/0116420 A1* | 4/2022 | Weber | G06N 20/00 |
| 2022/0272124 A1* | 8/2022 | Zawadzki | H04M 15/62 |
| 2023/0084532 A1* | 3/2023 | Chen | G06F 40/205 |
| | | | 726/26 |

* cited by examiner

US 11,907,658 B2

USER-AGENT ANOMALY DETECTION USING SENTENCE EMBEDDING

TECHNICAL FIELD

The present disclosure generally relates to computer security and more particularly to user-agent anomaly detection using sentence embedding according to various embodiments.

BACKGROUND

A computer network generally may include a collection of interconnected computing devices that exchange data and share resources. For example, such computing devices may include web servers, database servers, file servers, routers, end-user computers and other devices. A user-agent can be software, acting on behalf of a user, to perform tasks such as, for example, retrieving, rendering, and facilitating end-user interactions with Web content over the computer network. Example user-agents include web browsers and email readers. Detection of a manipulated or fraudulent user-agent could be an indication that a device is using an emulator or robot. Thus, detecting such user-agents may be an important step in detecting the presence of fraudulent devices and preventing fraud or other malicious computer activity.

Figure 1:
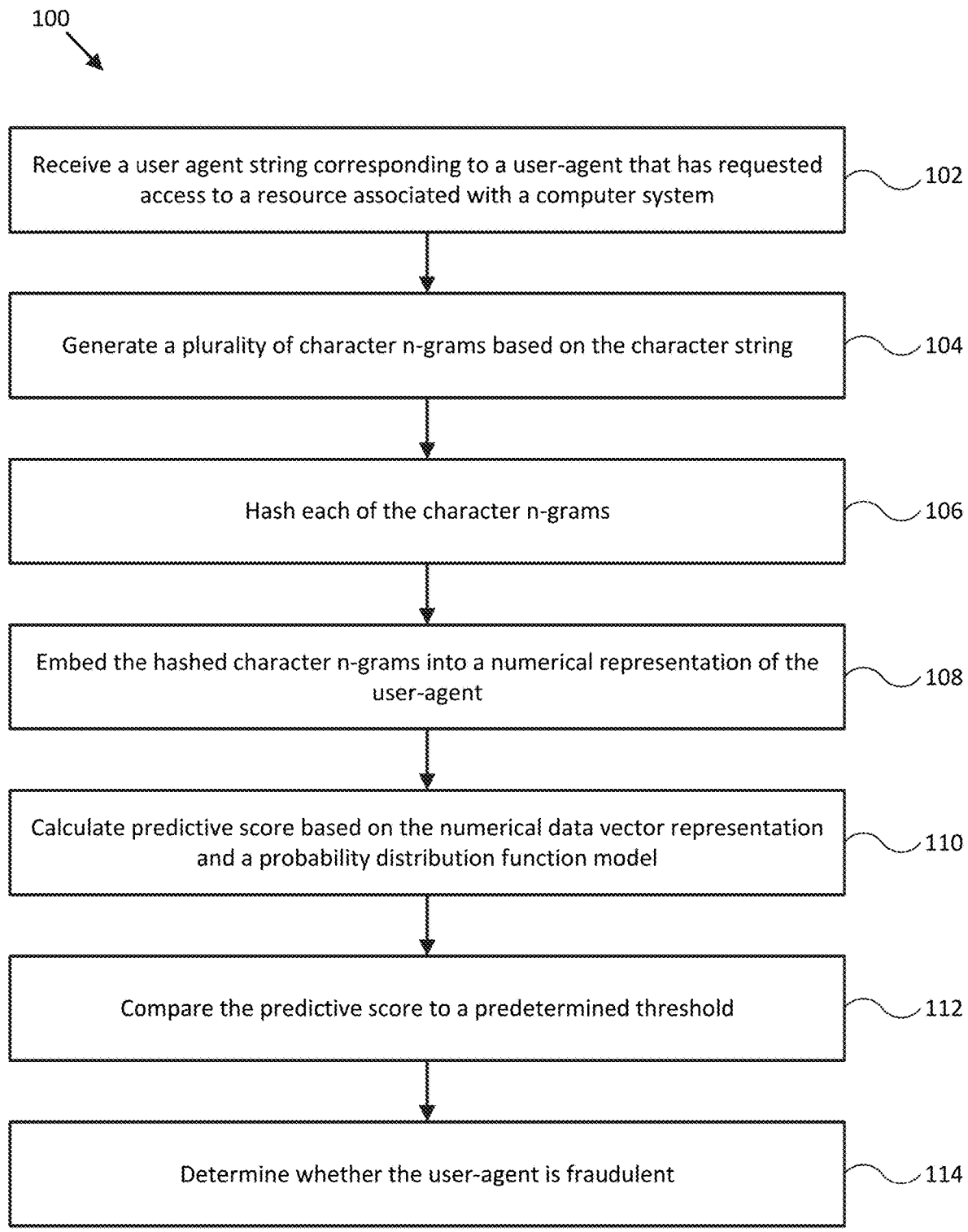
FIG. 1 illustrates a flow diagram of a process for user-agent anomaly detection using sentence embedding in accordance with one or more embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

A user-agent can be software, acting on behalf of a user, to perform tasks such as, for example, retrieving, rendering, and facilitating end-user interactions with content (e.g., web content or resources). Some example user-agents are web browsers, email readers, media players, and application plug-ins. When a user-agent operates in a network protocol, it often identifies itself, its application type, operating system, software vendor, or software revision, by submitting a characteristic identification string to its operating peer. In HTTP, SIP, and NNTP protocols, this identification is transmitted in a header field "User-Agent." In HTTP, a user-agent string is often used for content negotiation, where the origin server selects suitable content or operating parameters for a response to a requesting user-agent. For example, the user-agent string might be used by a web server to choose variants based on the known capabilities of a particular version of client software.

Detecting fraudulent user-agents (e.g., fake user-agents, spoofed user-agents, etc.) can be an important step in detecting fraudulent requesting-clients in a client-server environment as a manipulated or fraudulent user-agent strongly indicates the presence of an emulator or a robot. Identifying such user-agents can be a difficult task as user-agents can have a structure that, before its first appearance, had previously been unseen. Thus, it is not practical to use traditional rule-based methods that mostly rely on whitelists/blacklists used against certain types of fraudulent user-agents. Further, training a general machine learning model to perform the detection may be impractical since there are limited labeled fraudulent user-agent datasets (e.g., no public datasets). Additionally, although user-agents are identified in string-format (e.g., character string), traditionally there has been a lack of effective methods to extract useful features from user-agent strings. The present disclosure describes systems and methods to overcome the deficiencies of the traditional techniques for distinguishing legitimate and non-legitimate (e.g., fraudulent) user-agents.

In an embodiment, a method for detecting user-agent anomalies includes receiving a character string corresponding to a user-agent that has requested access to a file or resource. The character string may be embedded into a numerical data vector representation of the user-agent using a sentence embedding algorithm (e.g., FastText). A predictive score may be calculated based on the numerical data vector representation and a probability distribution function model. For example, the probability distribution function model may model a likelihood of occurrence of the observed user-agent based on patterns learned from historic data associated with user-agents that have requested access to files or resources of a computer system (e.g., historic payload data). For example, the model may be a Gaussian Mixture Model and the data vector representation may be inputted into the Gaussian Mixture Model to calculate the predictive score, which may represent how close or similar the data vector representation is to the majority Gaussian patterns mixed in the model. The predictive score may be compared to a threshold and, based on the comparison to the threshold, it may be determined whether the user-agent is fraudulent.

In a further embodiment, a computer system receives a character string corresponding to a user-agent that has requested access to a resource. The computer system may generate a plurality of character n-grams based on the character string. The computer system may hash each character n-gram via a hashing function. The computer system may embed the hashed character n-grams (e.g., hash values) into a numerical data vector representation of the user-agent. The computer system may calculate a predictive score based on the numerical data vector representation. The computer system may compare the predictive score to a threshold and determine whether the user-agent is fraudulent based on the comparison results.

Referring now to FIG. 1, illustrated is a flow diagram of a process 100 for detecting fraudulent user-agents in accordance with one or more embodiments of the present disclosure. The blocks of process 100 are described herein as occurring in serial, or linearly (e.g., one after another). However, multiple blocks of process 100 may occur in parallel. In addition, the blocks of process 100 need not be performed in the order shown and/or one or more of the blocks of process 100 need not be performed. It is noted that several of the steps and sub-steps in the blocks of process 100 may be described in reference to the additional figures of the present disclosure. In some embodiments, process 100 may be performed by a computer system comprising a non-transitory memory storing instructions corresponding to process 100 and one or more hardware processors configured to execute the instructions. In various embodiments, a non-transitory machine-readable medium may have instructions stored thereon which are executable to cause a machine to perform process 100.

At block 102, a system (e.g., a computer system) may receive a character string corresponding to a user-agent that has requested access to a resource (e.g., web content, log-in services, sign-up services, payment transaction services, text, web applications, images, archived messages, data, account information, e-services, audio files, video files, etc.) associated with the system. In some embodiments, the system may be a server system operating in a client-server environment and managed by a service provider. In an embodiment, the character string may be received as part of a client request in the client-server environment (e.g., an HTTP request).

Figure 3A:
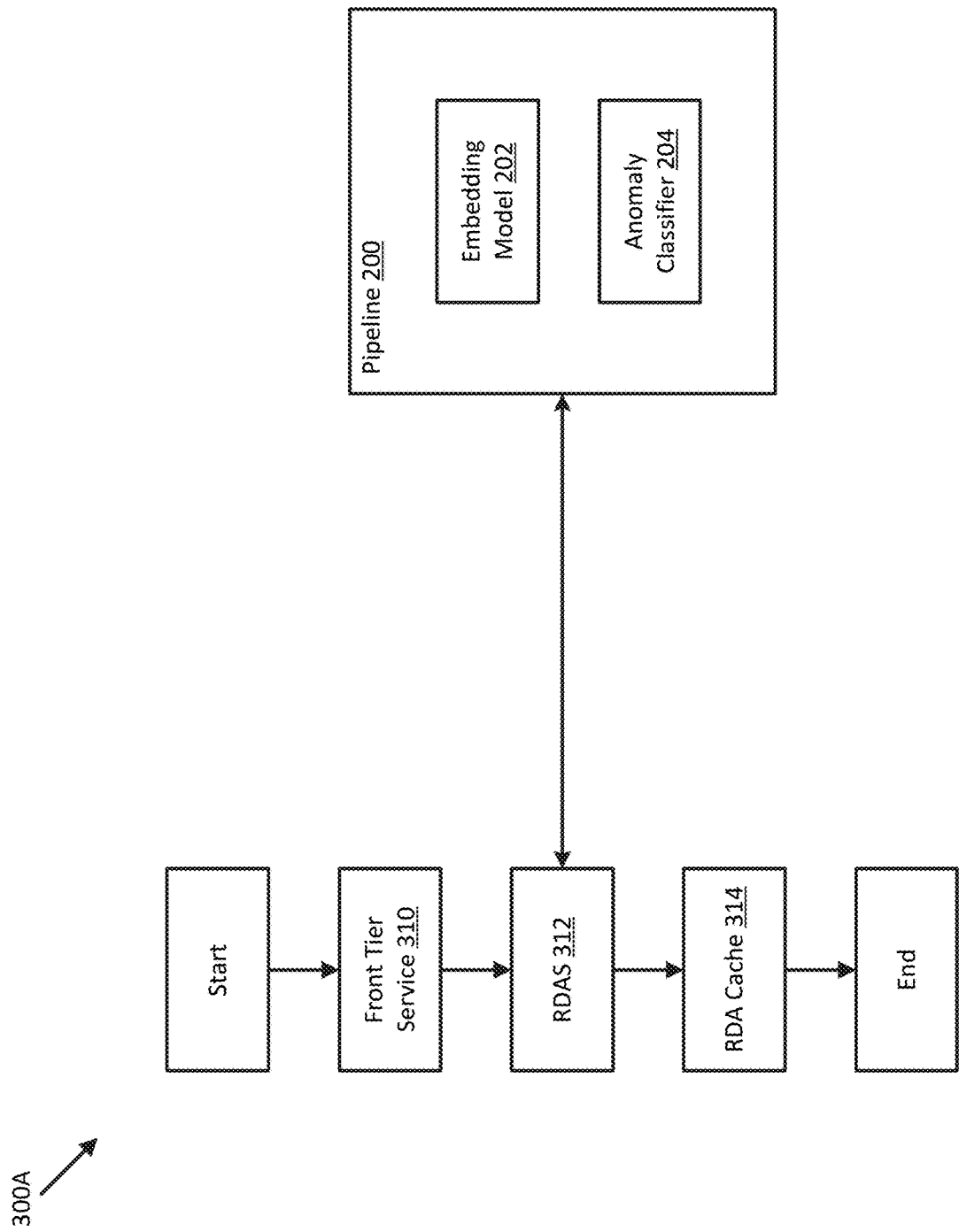
FIG. 3A illustrates a multilayered client-server architecture suitable for user-agent fraud detection in accordance with one or more embodiments of the present disclosure.

In some embodiments, as shown in multilayered client-server architecture 300A of FIG. 3A, the client request may be received by a front tier service 310. For example, the client request may be part of a user log in, user sign up, and/or conducting a payment transaction. Front tier service 310 may pass the client request or relevant information extracted from the client request to a risk data acquisition service (RDAS) 312, where the character string may be extracted if not already performed by front tier service 310. The character string may be provided to an artificial intelligence (AI) platform where the AI platform may provide user-agent anomaly detection services to RDAS 312 such as by performing process 100 or subprocesses thereof, as described herein, and outputting a predictive score for determining whether the user-agent is fraudulent. The RDAS 312 may append the score and the corresponding user-agent in risk data acquisition (RDA) cache 314 for future queries.

Referring back to FIG. 1, at block 104, the system may generate a plurality of character n-grams based on the character string (e.g., the user-agent string). In some embodiments, n-gram may refer to a contiguous sequence of n items from a given text. As a simple illustration, a list of character 3-grams for an example string "mobile" would be "<mo", "mob", "obi", "bil", "ile", and"le>", wherein "<" and ">" represent the beginning and ending of the string. A list of character 4-grams would be "<mob", "mobi", "obil", "bile", and "ile>". A list of character 5-grams would be "<mobi", "mobil", "obile", and "bile>". As a final example, a list of character 6-grams would be "<mobil", "mobile", and "obile>". The number n in the n-grams may be selected to suit a desired application. It is noted that, in some embodiments, "<" and ">" may not be used to represent the beginning and ending of a string.

At block 106, the system may hash each of the character n-grams from block 104 into hash values via a hashing function. Since there may be a large number of unique n-grams that are possible given the large number of user-agent strings in existence, applying a hashing function to character n-grams may bound memory requirements to permit scalability in implementing embodiments of the present disclosure. For example, there may be a unique dictionary of 1 to K items given all the user-agents in existence, but a hashed dictionary of 1 to B may be used where B is less than K. Although collisions may be possible, the hashing helps to control the vocabulary size. Various hashing functions may be used to suit a desired application as would be understood by one of skill in the art. As one example, the Fowler/Noll/Vo (FNV) hash may be used.

At block 108, the system may embed the hashed character n-grams into a numerical data vector representation of the user-agent. For example, the hashed character n-grams each may be a hash value corresponding to a dimension of a vector. In some embodiments, blocks 104, 106, and/or 108 may be part of a sentence embedding algorithm. For example, the FastText algorithm may be used to receive as input the raw user-agent string and transform the user-agent string into a data vector representation output (e.g., a 300-dimension vector). FastText allows for unsupervised training for representations of words or sentences and transforming words or sentences into its vector representations based on sentence semantics. Since FastText can distinguish n-grams of words (subwords), it can be generalized to unseen words/sentences. Oftentimes, user-agents appear as a first impression as they can take different forms and have evolved over time along with technology. Thus, the FastText algorithm may provide for scalability as user-agents change in the future, since it can be generalized to unseen words/sentences found in previously unseen user-agent strings. Other sentence embedding algorithms such as the Sentence-Bert algorithm may be implemented in some embodiments.

It will be appreciated that sentence embedding algorithms are different than rule-based tokenizers used to extract value information such as browser type, browser version, device specifications, etc. from user-agent strings. Building such rule-based tokenizers requires great manual effort and tokenizers are not able to generalize to previously unseen user-agents.

At block 110, the system may calculate a predictive score based on the numerical data vector representation and a probability distribution function model. The probability distribution function model may model a likelihood of occurrence of an observed user-agent based on patterns in historic data associated with user-agents that have requested access to resources associated with the system.

In one embodiment, a Gaussian Mixture Model (GMM) may be used as the probability distribution function model.

A GMM is a weighted sum of M component Gaussian densities as given by the following equation:

$$p(x|\lambda) = \Sigma_{i=1}^{M} w_i g(x|\mu_i, \Sigma_i)$$

where x is a D-dimensional continuous-valued data vector, $w_i$, i=1, . . . , M, are the mixture weights, and g, i=1, . . . , M are the component Gaussian densities. In this regard, a machine learning anomaly classifier based on the GMM can learn patterns in user-agents (e.g., from recorded payload data) and model the majority user-agents with a mixture of Gaussian distributions. For example, the M-component densities may correspond to normal distributions of subpopulations of user-agents.

An Expectation-Maximization (EM) algorithm may be used in some embodiments to obtain maximum likelihood estimates for the parameters of the density functions of the GMM.

In training the anomaly classifier, historic payload data of which a majority of user-agents are legitimate can be used for training. For example, payload data and any related metadata corresponding to client requests for resources associated with the system may be aggregated and recorded over time and can be used as the historic data to train the GMM of the anomaly classifier. The historic payload data should be sufficiently known to safely assume that the majority of user-agents are legitimate. A small number of fraudulent user-agents in the historic payload data should not affect training the GMM as the GMM will capture the majority patterns of user-agents. In some embodiments, user-agents strings extracted from the historic payload data may be converted into numerical vector representations, for example, using a sentence embedding algorithm such as FastText, so that the EM algorithm can be used to train the GMM (e.g., obtain parameters of the density functions to generate the GMM).

By converting a user-agent character string into a vector representation through sentence embedding, the incoming corresponding user-agent can be compared to the majority patterns in the mixture of Gaussian distributions by the anomaly classifier, and if the user-agent does not conform to the majority, it may be identified as possibly being fraudulent. The GMM may output the predictive score (e.g., log-likelihood score) for the user-agent to be used at block 112.

At block 112, the system may compare the predictive score to a threshold. The threshold should be determined so as to appropriately differentiate certain user-agents as anomalies relative to the majority of seen user-agents as represented in the GMM. In testing, to determine an optimized threshold for a desired application, the predictive model from block 110 may be executed over a large amount of payload test data offline. In some embodiments, the threshold may be automatically calculated by optimizing a micro/macro F-score in the predictive model testing. In various implementations, several thresholds may be used to adjust the desired sensitivity of anomaly detection. For example, one threshold may be very conservative, a second threshold may be conservative, and a third threshold may be non-conservative.

In an embodiment, the very conservative threshold may be determined by maximizing the micro F-score in testing the predictive model. In an embodiment, the conservative threshold may be determined my maximizing the macro F-score in testing the predictive model. The conservative threshold may provide a relatively balanced prediction for legitimate and fraudulent user-agents. In an embodiment, the non-conservative threshold may be set to zero as the prediction score outputted by the prediction model may be a log score and relatively good predictions can still be achieved.

At block 114, the system may determine whether the user-agent is fraudulent. For example, based on the comparison at block 112, the system may determine that the predictive score meets or exceeds an appropriate threshold and consequently determine that the user-agent is fraudulent, or determine that the predictive score does not meet the appropriate threshold and determine that the user-agent is not fraudulent.

Figure 2:
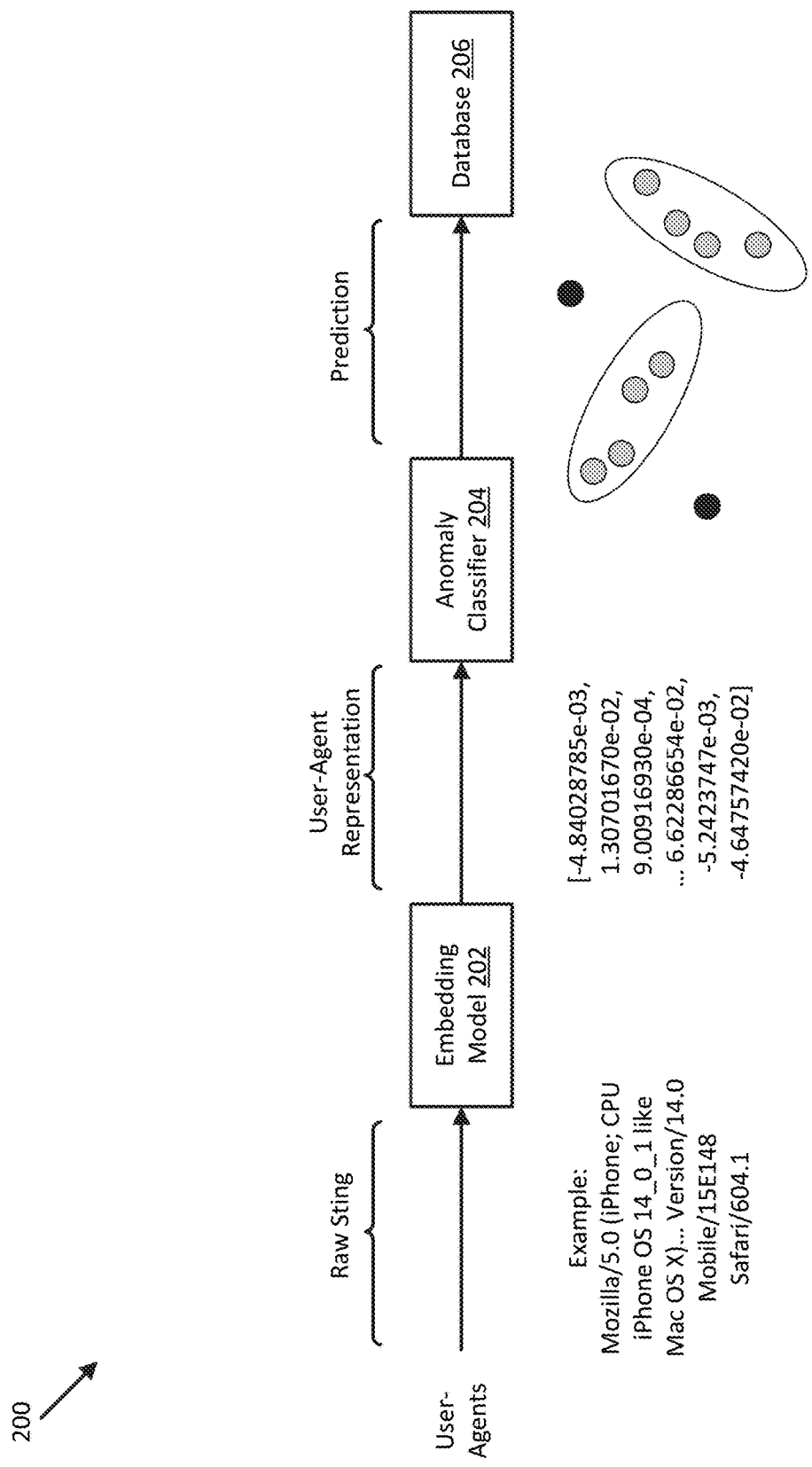
FIG. 2 illustrates a user-agent fraud detection pipeline in accordance with one or more embodiments of the present disclosure.

Referring now to FIG. 2, illustrated is a fraudulent user-agent detection pipeline 200 in accordance with one or more embodiments of the present disclosure. In the pipeline, a raw user-agent string is inputted to an embedding model 202, which outputs a data vector representation of the user-agent.

For example, as shown in FIG. 2, a user-agent string "Mozilla/5.0 (iPhone; CPU iPhone OS 14_0_1 like Mac OS X) . . . . Version/14.0 Mobile/15E148 Safari/604.1" may be inputted to the embedding model 202.

A data vector representation [−4.84028785e-03, 1.30701670e-02, 9.00916930e-04, . . . 6.62286654e-02, −5.2423747e-03, −4.64757420e-02] may be outputted.

According to various embodiments, embedding model 202 may execute a sentence embedding algorithm to transform the raw user-agent string into the vector representation. For example, embedding model 202 may use the FastText algorithm to transform the raw user-agent string into the vector representation. Other sentence embedding algorithms such as SentenceBert may be implemented in certain embodiments. It will be appreciated that some sentence embedding algorithms such as FastText may be quicker to encode user-agent strings than others.

The data vector representation may then be inputted to an anomaly classifier 204. The anomaly classifier may include an anomaly detection machine learning model. For example, a GMM may be used to detect anomalies in the anomaly classifier 204. The GMM can be trained to learn how the majority of user-agents appear in terms of their vector representations. A user-agent can be detected as an anomaly if it deviates from the majority.

The following is one example of how anomaly classifier 204 may be trained and tested. A plurality of non-emulator payloads may be marked as normal (e.g., 131,284 non-emulator IOS/Android user-agents can all be marked as non-fraudulent). User-agents from an emulator payload and that do not appear in the non-emulator payloads can be marked as anomalies (e.g., a total of 938 emulator IOS/Android user-agents where 431 of them are marked as fraudulent). The FastText algorithm, or other sentence embedding algorithm, may be used to transform all of the user-agents into vector representations. The anomaly classifier can be trained based on the non-emulator payloads marked as normal. The 938 user-agents from the emulator payload may be passed through pipeline 200 to anomaly classifier 204 to test anomaly classifier 204 once it has been trained.

Various test result measurements may be used to determine the suitability of anomaly classifier 204, such as accuracy, precision, recall, and F-score. In some embodiments, the AUC of ROC (Area Under the Curve of Receiver Characteristic Operator) curve may be used to inform how well anomaly classifier 204 is performing. The ROC curve is an evaluation metric for binary classification problems. The ROC curve is a probability curve that plots the true positive rate against false positive rates at various threshold values. The AUC does not rely on a decision prediction threshold. The AUC is the measure of the ability of a classifier to distinguish between classes and is generally used as a summary of the ROC curve. Generally, the higher the AUC (e.g., from 0 to 1), the better the performance of the model at distinguishing between positive and negative classes, or in the context of the present disclosure, between fraudulent and legitimate user-agents. For example, when AUC is 1, the anomaly classifier 204 is able to perfectly distinguish between fraudulent and legitimate user-agents. When AUC is 0, anomaly classifier 204 would be predicting all legitimate user-agents as fraudulent, and all fraudulent user-agents as legitimate. When AUC is between 0.5 and 1 (e.g., an AUC of 0.844), there is a high chance that anomaly classifier 204 will be able to distinguish fraudulent user-agents from legitimate user-agents.

The prediction outputted by anomaly classifier 204 may include a comparison of the GMM output to a threshold according to some embodiments. If the output from the GMM meets or exceeds the threshold, the prediction may reflect that the user-agent is an anomaly, otherwise the user-agent may be marked as normal. The prediction outputted by anomaly classifier 204 may be stored in database 206. In some cases, the prediction may allow for further investigation of the user-agent to further confirm whether the user-agent is fraudulent or not. In some cases, the prediction can be associated with the user-agent string and the user-agent string can be placed on a whitelist or blacklist for further investigation and/or blocking the user-agent so that the user-agent is prevented from accessing any resources to which it has requested access. Other remedial actions are also contemplated (e.g., IP address blocking, user-agent activity monitoring, etc.).

Figure 3B:
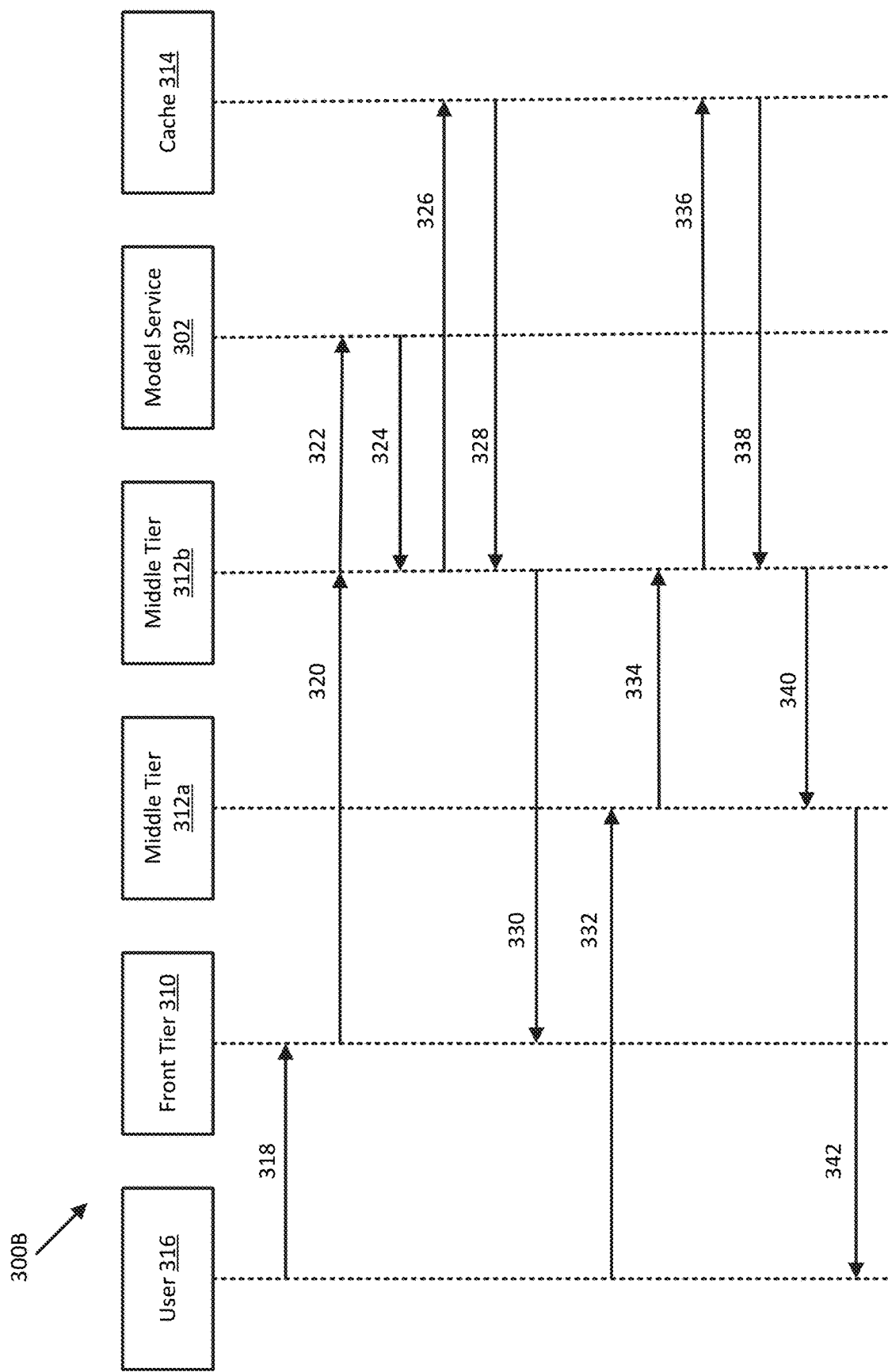
FIG. 3B illustrates a timing sequence for a multilayered client-server architecture used in user-agent fraud detection according to one or more embodiments of the present disclosure.

Referring now to FIG. 3B, illustrated is a timing sequence 300B for a multilayered client-server architecture according to one or more embodiments of the present disclosure. The multilayered client-server architecture may include a front tier 310, middle tiers 312a and 312b, a model service 302, and cache 314. Front tier 310 may be a client-facing tier that manages collecting data from client devices. For example, when there is an event such as a user log in or user sign up, front tier service 310 may receive the data from the client device associated with the event. Middle tiers 312a and 312b may be tiers in the multilayered client-server architecture which may manage performing services, for example, services related to payment transactions (e.g., payment requests, checkout requests) and fraud-risk analysis and adjudication. For example, middle tiers 312a and 312b may be components of a Risk Data Acquisition tier upon which front tier 310 relies for determining fraud-risk for incoming requests from user-agents. Model service 302 may provide services to middle tiers 312a and 312b by calculating predictive score for user-agents, for example, by process 100 of FIG. 1 and/or through pipeline 200 of FIG. 2, which can be used to detect whether the user-agents are fraudulent. Cache 314 may be used to store the predictive scores, so that, in the future, detecting fraudulent user-agents that are similar to previously seen/analyzed user-agents can be quickly performed through query.

At operation 318, front tier 310 may receive a client request from a user-agent running on a client device of user 316. For example, the client request may be part of a user log in, user sign up, or payment transaction. At operation 320, raw data from the client request can be passed to middle tier 312b for determining whether the user-agent acting on behalf of the user is fraudulent or legitimate. Middle tier 312b may provide the raw data, including a user-agent string, to model service 302 at operation 322, and make a request to model service 302 to provide middle tier 312b with a prediction score for the user-agent. Model service 302 may perform process 100 and provide a response to middle tier 312b with the prediction score and/or a classification of the user-agent as either fraudulent or legitimate at operation 324. Middle tier 312b may store the response from model service 302 in cache 314 for future queries regarding the legitimacy of the user-agent at operation 326. Cache 314 may store data in various schemas as would be understood by one skilled in the art to allow for quick lookup of user-agents that have been analyzed and associated with a predictive score. For example, user-agents may be linked to a client device identifier in cache 314 so that when a client device request, which includes the client device identifier, is received, the client device can be traced back to a user-agent prediction that is mapped to the client device identifier. Once stored at cache 314, the response can be passed back through middle tier 312b to front tier 310 at operations 328 and 330. Front tier 310 and/or middle tier 312b may then take an appropriate action including any remedial actions if necessary.

At operation 332, such as during a future event (e.g., payment transaction checkout), middle tier 312a may receive a request including an identifier (e.g., user-agent string, client device identifier) for the user-agent acting on behalf of user 316 and pass it to middle tier 312b at operation 334 to determine whether the user-agent is a fraud risk. Middle tier 312b may query cache 314 at operation 336 using the identifier for the user-agent. Cache 314 may provide a response at operation 338 indicating the predictive score associated with the user-agent and/or an indication as to whether the user-agent is fraudulent or not. The response may be passed to middle tier 312a at operation 340 and, based on the response, middle tier 312a may respond to the client request from user 316 accordingly at operation 342. For example, the middle tier 312a may grant the client request and respond with the requested resources and services. Where the user-agent is classified as fraudulent, middle tier 312a may deny the request received by the user-agent, and further, in some embodiments may prevent the user-agent from submitting additional requests or may take another remedial action as discussed herein.

Figure 4:
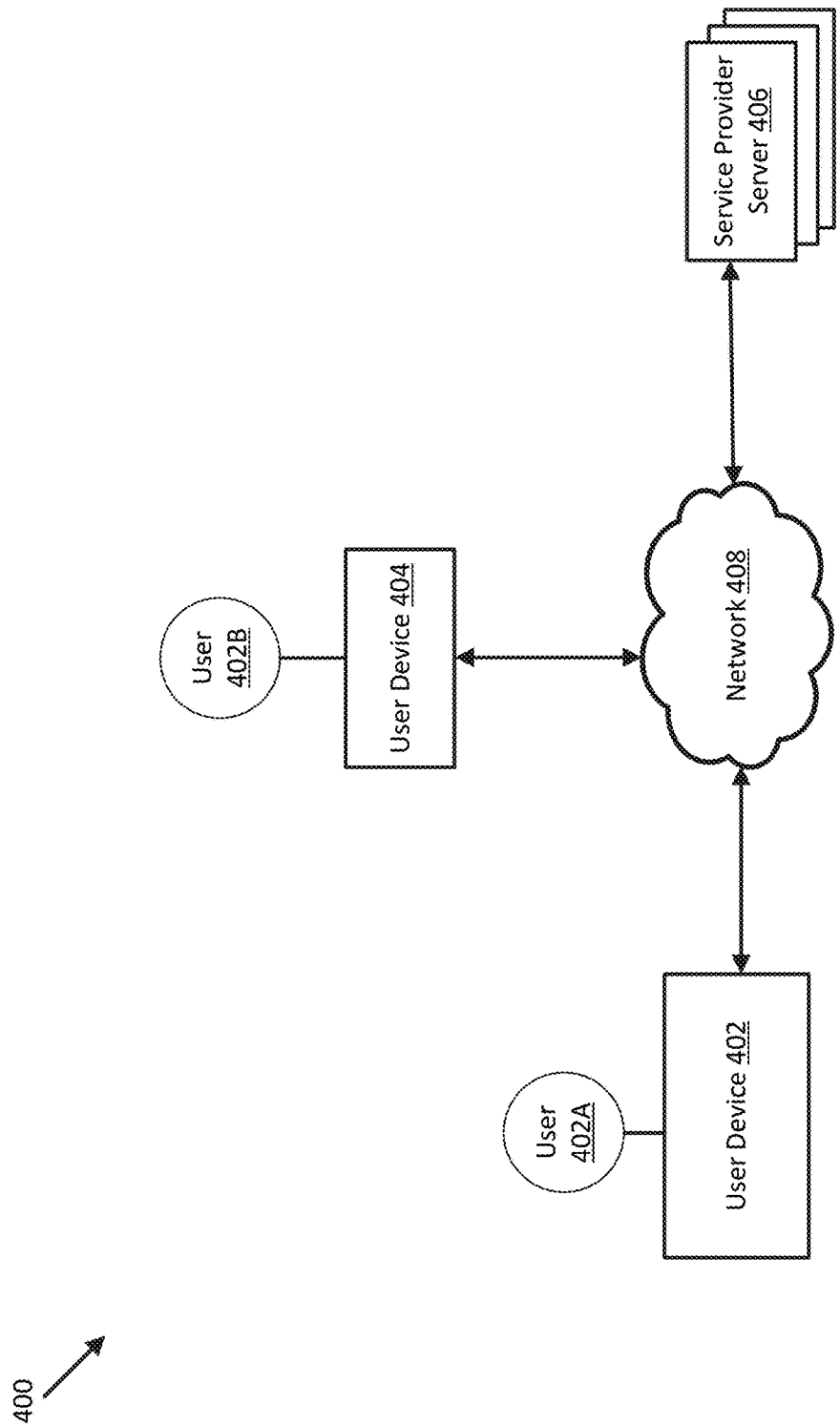
FIG. 4 illustrates a block diagram of a networked system suitable for implementing one or more embodiments of the present disclosure.

Referring now to FIG. 4, a block diagram of a networked system 400 configured for user-agent anomaly detection using sentence embedding in accordance with one or more embodiments of the present disclosure is illustrated. System 400 includes user devices 402 and 404 and service provider server(s) 406. A user 402A is associated with user device 402, where user 402A can provide an input to service provider server 406 using user device 402.

User device 402 and service provider server 406 may each include one or more processors, memories, and other appropriate components for executing instructions such as program code and/or data stored on one or more computer-readable mediums to implement the various applications, data, and steps described herein. For example, such instructions may be stored in one or more computer-readable media such as memories or data storage devices internal and/or external to various components of system 400, and/or accessible over a network 408. Each of the memories may be non-transitory memory. Network 408 may be implemented as a single network or a combination of multiple networks. For example, in various embodiments, network 408 may include the Internet or one or more intranets, landline networks, and/or other appropriate types of networks.

User device 402 may be implemented using any appropriate hardware and software configured for wired and/or wireless communication over network 408. For example, in some embodiments, user device 402 may be implemented as a personal computer (PC), a mobile phone, personal digital assistant (PDA), laptop computer, and/or other types of computing devices capable of transmitting and/or receiving data, such as an iPhone™, Watch™, or iPad™ from Apple™.

User device 402 may include one or more user-agents such as browser applications which may enable the user device 402 to access various web applications provided by service provider server(s) 406 over network 408. User device 402 may also include one or more toolbar applications which may be used, for example, to provide client-side processing for performing desired tasks in response to operations selected by user 402A. In one embodiment, the toolbar application may display a user interface in connection with the browser application.

User device 402 may further include other applications as may be desired in particular embodiments to provide desired features to user device 402. For example, the other applications may include an application to interface between service provider server 406 and the network 408, security applications for implementing client-side security features, programming client applications for interfacing with appropriate application programming interfaces (APIs) over network 408, or other types of applications. In some cases, the APIs may correspond to service provider server 406. The applications may also include email, texting, voice, and instant messaging applications that allow user 402A to send and receive emails, calls, and texts through network 408, as well as applications that enable the user to communicate to service provider server 406 as discussed above. User device 402 includes one or more device identifiers which may be implemented, for example, as operating system registry entries, cookies associated with the browser application, identifiers associated with hardware of user device 402, or other appropriate identifiers, such as those used for user, payment, device location, and or authentication. In some embodiments, a device identifier may be used by service provider server 406 to associate user 402A with a particular account maintained by the service provider server 406. A communications application with associated interfaces facilitates communication between user device 402 and other components within system 400. User device 404 may be similar to user device 402 and may be used to perform desired tasks in response to operations selected by user 402B.

Service provider server 406 may be maintained, for example, by an online cloud service provider. In this regard, service provider server 406 includes one or more applications which may be configured to interact with user device 402 and user device 404 over network 408 to facilitate the provision of client application functionality as discussed in the present disclosure. Service provider server 406 maintains a plurality of user accounts (e.g., stored in a user account database accessible by service provider server 406), each of which may include individual user data and preferences.

Figure 5:
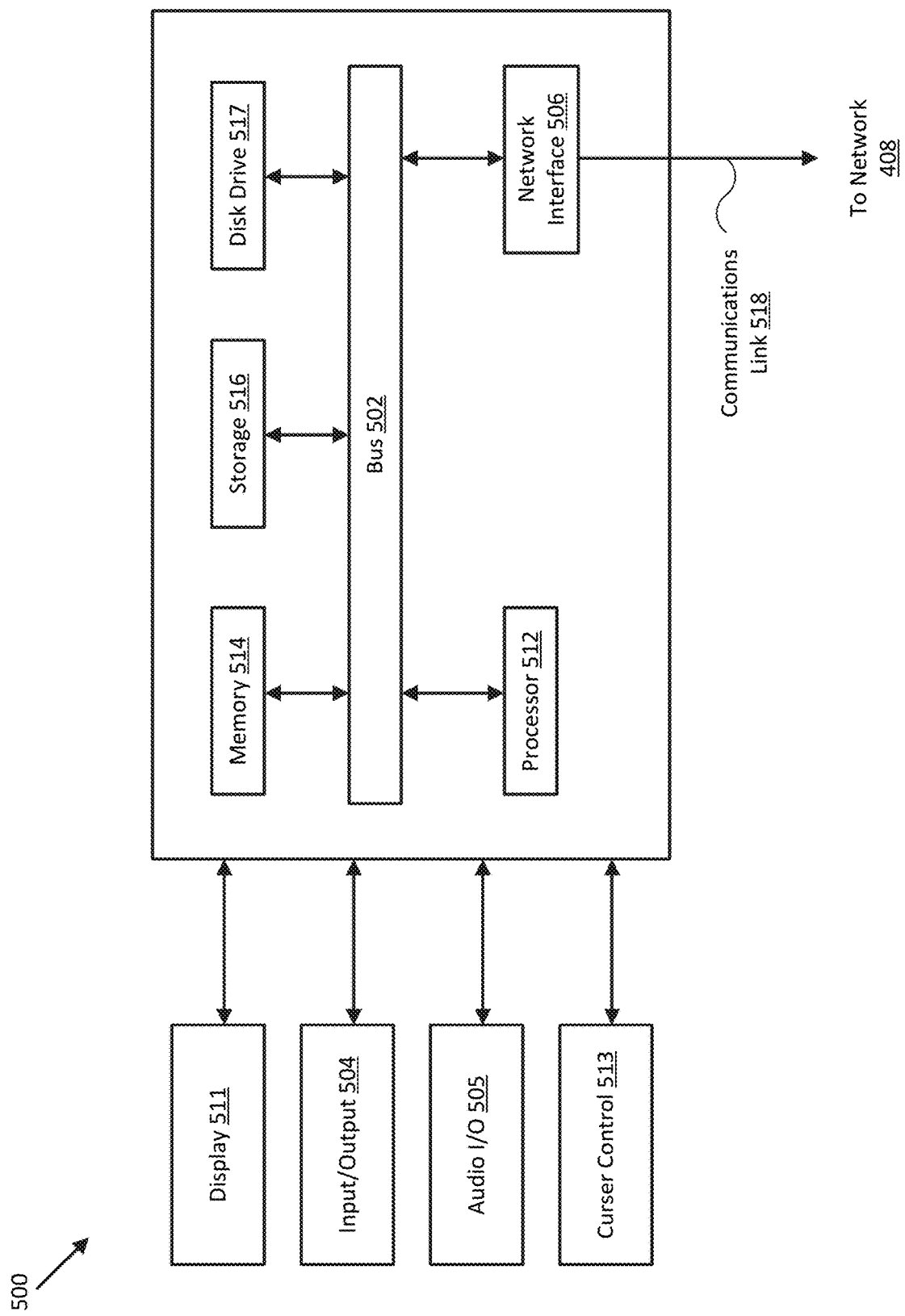
FIG. 5 illustrates a block diagram of a computer system in accordance with one or more embodiments of the present disclosure.

FIG. 5 illustrates a block diagram of a computer system 500 suitable for implementing one or more embodiments of the present disclosure. In various implementations, the computer system 500 may comprise a personal computing device (e.g., a personal computer, laptop, smart phone, PDA, Bluetooth device, key FOB, badge, wearable device such as a smart watch, smart TV, or any other visual accessibility capable device) and/or a server computing device. It should be appreciated that each of the devices utilized by users and service providers discussed herein may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons or links, etc., and sends a corresponding signal to bus 502. I/O component 504 may also include an output component, such as a display 511 and a cursor control 513 (such as a keyboard, keypad, mouse, etc.). I/O component 504 may further include NFC communication capabilities. An optional audio I/O component 505 may also be included to allow a user to use voice for inputting information by converting audio signals. Audio I/O component 505 may allow the user to hear audio such as audible descriptions provided by a screen reader application. A transceiver or network interface 506 transmits and receives signals between computer system 500 and other devices, such as another user device, an entity server, and/or a provider server via network 408. In one embodiment, the transmission is wireless, although other transmission mediums and methods may also be suitable. Processor 512, which may be one or more hardware processors, can be a micro-controller, digital signal processor (DSP), or other processing component, processes these various signals, such as for display on computer system 500 or transmission to other devices via a communication link 518. Processor 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor 512 and other components by executing one or more sequences of instructions contained in system memory component 514. Logic may be encoded in a computer-readable medium, which may refer to any medium that participates in providing instructions to processor 512 for execution. Such a medium may take many forms, including but not limited to, non-volatile media, volatile media, and transmission media. In various implementations, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network 408 (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A computer system comprising:
a non-transitory memory storing instructions; and
one or more hardware processors configured to read the instructions and cause the computer system to perform operations comprising:
receiving, from a user-agent computer application of a device, a request to access a resource of the computer system;
determining, based on the request, a character string that identifies the user-agent computer application;
generating, from the character string, a plurality of character n-grams based on a plurality of word sizes, wherein the plurality of character n-grams comprises at least a first set of character n-grams corresponding to a first word size and a second set of character n-grams corresponding to a second word size;
determining a plurality of hash values based on performing one or more hash functions on the plurality of character n-grams;
embedding, using a sentence embedding algorithm, the character string into a numerical data vector representation of the user-agent client application based on the plurality of hash values, wherein the embedding comprises transforming each of the plurality of hash values into a numerical value within the numerical data vector representation of the user-agent computer application;
calculating, for the user-agent client application, a predictive score based on the numerical data vector representation, wherein the predictive score indicates whether the character string that identifies the user-agent computer application corresponds to an anomaly based on a probability distribution function that models patterns learned from historic data associated with a plurality of user-agent computer applications;
comparing the predictive score to a threshold; and
determining, based on the comparing, whether the user-agent computer application corresponds to a fraudulent application.

2. The computer system of claim 1, wherein the probability distribution function comprises a Gaussian Mixture Model, having a weighted sum of M-component Gaussian densities, generated based on the patterns learned from the historic data associated with the plurality of user-agent computer applications, and wherein the M-component Gaussian densities correspond to normal distributions of subpopulations of the plurality of user-agent computer applications.

3. The computer system of claim 1, wherein the operations further comprise:
aggregating the historic data associated with the plurality of user-agent computer applications;
based on the historic data, extracting a plurality of character strings for the plurality of user-agent computer applications;
embedding the plurality of character strings into a plurality of respective numerical data vector representations for the plurality of user-agent computer applications; and
generating the probability distribution function based on the plurality of respective numerical data vector representations.

4. The computer system of claim 1, wherein the character string represents two or more of an operating system type of an operating system of the device, an application model associated with the user-agent computer application, a device type associated with the device, or a device manufacturer associated with the device.

5. The computer system of claim 1, wherein the numerical data vector representation has a dimensionality that corresponds to a parameter of the probability distribution function.

6. The computer system of claim 1, wherein the request is a Hypertext Transfer Protocol (HTTP) request, and wherein the character string is extracted from the HTTP request.

7. The computer system of claim 1, wherein the operations further comprise denying the user-agent computer application from accessing the resource in response to determining that the user-agent computer application corresponds to the fraudulent application.

8. A method comprising:
receiving, by a computer system, a request from a user-agent application of a device to access at least one resource associated with a service provider system;
extracting, from the request, an identifier of the user-agent application, wherein the identifier comprises a character string;
generating, from the character string, a plurality of character n-grams based on a plurality of word sizes, wherein the plurality of character n-grams comprises a first set of character n-grams corresponding to a first word size and a second set of character n-grams corresponding to a second word size;

determining a plurality of hash values based on performing one or more hash functions on the plurality of character n-grams;

converting, by the computer system, the character string into a numerical data vector representation of the user-agent application based on the plurality of hash values, wherein the converting comprises transforming each of the plurality of hash values into a numerical value within the numerical data vector representation of the user-agent application;

calculating, by the computer system and for the user-agent application, a predictive score based on the numerical data vector representation, wherein the predictive score indicates whether the identifier of the user-agent application corresponds to an anomaly based on a probability distribution function that models patterns learned from historic data associated with a plurality of user-agent applications that have requested access to the at least one resource associated with the service provider system;

comparing, by the computer system, the predictive score to a threshold; and based on the comparing, classifying, by the computer system, the user-agent application as non-fraudulent or fraudulent.

9. The method of claim 8, wherein the probability distribution function comprises a Gaussian Mixture Model, having a weighted sum of M-component Gaussian densities, generated based on the patterns learned from the historic data associated with the plurality of user-agent applications that have requested access to the at least one resource associated with the service provider system, and wherein the M-component Gaussian densities correspond to normal distributions of subpopulations of the plurality of user-agent applications.

10. The method of claim 8, further comprising:
aggregating, by the computer system, the historic data associated with the plurality of user-agent applications that have requested access to the at least one resource associated with the computer system;

based on the historic data, extracting, by the computer system, a plurality of character strings for the plurality of user-agent applications;

converting, by the computer system, the plurality of character strings into a plurality of respective numerical data vector representations of the plurality of user-agent applications; and generating, by the computer system, the probability distribution function based on the plurality of respective numerical data vector representations.

11. The method of claim 10, wherein the converting the plurality of character strings into the plurality of respective numerical data vector representations is performed using a FastText algorithm.

12. The method of claim 8, wherein the numerical data vector representation has at least 300 dimensions.

13. The method of claim 8, further comprising:
classifying the user-agent application as fraudulent based on the comparing; and
storing the character string in a blacklist database that prevents the user-agent application from accessing the at least one resource.

14. The method of claim 13, further comprising blocking an Internet Protocol address associated with the device.

15. A non-transitory machine-readable medium having instructions stored thereon, wherein the instructions are executable to cause a machine of a system to perform operations comprising:
receiving, from a user-agent client application of a user device and over a network, a request to access a computer resource associated with a service provider;

extracting, from the request, an identifier of the user-agent client application, wherein the identifier comprises a character string;

generating, from the character string, a plurality of character n-grams based on a plurality of different word sizes, wherein the plurality of character n-grams comprises at least a first set of character n-grams corresponding to a first word size and a second set of character n-grams corresponding to a second word size;

determining a plurality of hash values based on performing one or more hash functions on the plurality of character n-grams;

embedding, using a sentence embedding algorithm, the identifier into a numerical data vector representation of the user-agent client application based on the plurality of hash values, wherein the embedding comprises transforming each of the plurality of hash values into a numerical value within the numerical data vector representation of the user-agent client application;

calculating, for the user-agent client application, a predictive score based on the numerical data vector representation, wherein the predictive score indicates whether the identifier of the user-agent client application corresponds to an anomaly based on a probability distribution function that models patterns learned from historic data associated with a plurality of user-agent client applications;

comparing the predictive score to a threshold; and determining a classification for the user-agent client application based on the comparing, wherein the classification indicates whether the user-agent client application corresponds to a fraudulent application or a legitimate application; and processing the request based on the classification of the user-agent client application.

16. The non-transitory machine-readable medium of claim 15, wherein the probability distribution function comprises a Gaussian Mixture Model, having a weighted sum of M-component Gaussian densities, generated based on the patterns learned from the historic data associated with the plurality of user-agent client applications that have requested access to resources of the service provider, and wherein the M-component Gaussian densities correspond to normal distributions of subpopulations of the plurality of user-agent client applications.

17. The non-transitory machine-readable medium of claim 15, wherein the operations further comprise:
aggregating the historic data associated with the plurality of user-agent client applications that have requested access to computer resources of the service provider;

based on the historic data, extracting a plurality of character strings for the plurality of user-agent client applications;

embedding the plurality of character strings into a plurality of respective numerical data vector representations for the plurality of user-agent client applications; and generating the probability distribution function based on the plurality of respective numerical data vector representations.

18. The non-transitory machine-readable medium of claim 17, wherein the embedding the plurality of character strings into the plurality of respective numerical data vector representations is performed using a FastText algorithm.

19. The non-transitory machine-readable medium of claim 15, wherein the character string represents a browser type, a browser version, and one or more hardware and software specifications of the user device.

20. The non-transitory machine-readable medium of claim 15, wherein the processing the request comprises denying the request to access the computer resource in response to determining that the classification indicates that the user-agent client application corresponds to the fraudulent application.

* * * * *